(12) United States Patent
Grange et al.

(10) Patent No.: US 10,874,961 B2
(45) Date of Patent: Dec. 29, 2020

(54) FILTER ELEMENT FOR A VEHICLE

(71) Applicant: VOLVO TRUCK CORPORATION, Gothenburg (SE)

(72) Inventors: Thomas Grange, Lyons (FR); Baptiste Boutin, La Tour du Pin (FR)

(73) Assignee: VOLVO TRUCK CORPORATION, Göteborg (SE)

( * ) Notice: Subject to any disclaimer, the term of this patent is extended or adjusted under 35 U.S.C. 154(b) by 0 days.

(21) Appl. No.: 16/075,708

(22) PCT Filed: Mar. 4, 2016

(86) PCT No.: PCT/IB2016/000421
§ 371 (c)(1),
(2) Date: Aug. 6, 2018

(87) PCT Pub. No.: WO2017/149344
PCT Pub. Date: Sep. 8, 2017

(65) Prior Publication Data
US 2019/0060802 A1 Feb. 28, 2019

(51) Int. Cl.
*B01D 35/153* (2006.01)
*B01D 29/96* (2006.01)
(Continued)

(52) U.S. Cl.
CPC ......... *B01D 35/153* (2013.01); *B01D 29/21* (2013.01); *B01D 29/96* (2013.01); *B01D 35/005* (2013.01);
(Continued)

(58) Field of Classification Search
CPC .... B01D 35/153; B01D 35/005; B01D 29/96; B01D 29/21; B01D 2201/4046;
(Continued)

(56) References Cited

U.S. PATENT DOCUMENTS

| 5,413,712 A | * | 5/1995 | Gewiss | B01D 29/21 210/450 |
| 2005/0145558 A1 | * | 7/2005 | Ciak | B01D 35/157 210/420 |

(Continued)

FOREIGN PATENT DOCUMENTS

| DE | 102007030278 A1 | * | 1/2008 | ............. B01D 29/21 |
| DE | 102007030278 A1 | | 1/2008 | |
| EP | 0580491 A1 | | 1/1994 | |

OTHER PUBLICATIONS

English translation of DE 102007030278.*

(Continued)

*Primary Examiner* — Madeline Gonzalez
(74) *Attorney, Agent, or Firm* — Venable LLP; Jeffri A. Kaminski (57) ABSTRACT

A filter element includes:
a filter medium having an axis and forming an axial channel; a first and a second end plates, each end plate covering one axial end of the filter medium and being sealingly mounted on the axial end, the first end plate having an central opening coaxial and in fluid communication with the channel;
the filter element being designed to be placed in a filter housing for forming a liquid filtering device, whereby a liquid to be filtered can flow along a liquid path through the filter medium towards the channel and out of the filter element through the central opening.
The filter element further includes further includes a detachable plug whose position can change from an attached position to a detached position. In the attached position the detachable plug is attached to an immobile portion of the filter element and seals the central opening, and in the detached position the detachable plug is detached from the immobile portion and is movable away from the central (Continued)

opening inside the channel and along the filter element axis to unseal the central opening.

28 Claims, 5 Drawing Sheets

(51) Int. Cl.
    *B01D 29/21*     (2006.01)
    *B01D 35/00*     (2006.01)

(52) U.S. Cl.
    CPC ............... *B01D 2201/0415* (2013.01); *B01D 2201/291* (2013.01); *B01D 2201/316* (2013.01); *B01D 2201/4046* (2013.01)

(58) Field of Classification Search
    CPC ........ B01D 2201/316; B01D 2201/291; B01D 2201/0415

USPC .......................... 210/233–236, 117, 130, 136
See application file for complete search history.

(56) References Cited

U.S. PATENT DOCUMENTS

2010/0213115 A1    8/2010   Thomas et al.
2015/0251115 A1*  9/2015   Boston ................. F16K 15/063
                                                                                             210/130

OTHER PUBLICATIONS

International Search Report dated (Nov. 2, 2016) for corresponding International App. PCT/IB2016/000421.
Office Action dated Dec. 17, 2019 in EP Application No. 16715609.0, 4 pages.

* cited by examiner

FILTER ELEMENT FOR A VEHICLE

BACKGROUND AND SUMMARY

The invention relates to a filter element, in particular for filtering a liquid in a vehicle such as fuel or oil. The invention also relates to a liquid filtering device comprising such a filter element, and to a vehicle comprising such a liquid filtering device.

The invention can be applied in passenger car vehicles or in heavy-duty vehicles, such as trucks, buses and construction equipment.

Liquid filters are commonly provided in vehicles to remove contaminants from said liquid, which can be fuel or oil for example.

A conventional filter element may comprise a filter medium forming an axial channel, the axial ends of said filter medium being covered by end plates sealingly mounted on said axial ends. Furthermore, one end plate includes an central opening substantially coaxial and in fluid communication with the channel. Such a filter element is housed in a casing comprising a filter housing and a filter cover, the casing comprising an inlet port and an outlet port for the liquid, one of said ports being in fluid communication with said central opening.

Thus, a liquid to be filtered can flow inside the casing by the inlet, through the filter medium, and then the filtered liquid can exit the filter element by the central opening and, ultimately, can exit the casing by the outlet.

Because the filter medium progressively gets clogged, the filter element needs to be periodically changed so that it remains effective. To that end, the filter cover is removed from the filter housing, the old filter element is removed, and a new filter element is inserted in the filter housing before the filter cover is closed again.

Conventionally, a new filter element is delivered to the dealer in a protecting package, which prevents the clean side of the filter medium against external contamination during transportation and manipulation at the workshop. Indeed, the clean side of the filter medium has to be kept clean as it is located downstream the filter medium, meaning that particles located in this area will not be stopped by the filter medium. Such a protecting package can be a plastic bag, a plastic cap, or a shrink wrap.

A weakness of this solution is that the component used to protect the clean side of the filter medium has to be removed before the filter element is inserted into the filter housing. In other words, between the removal of the protecting component and the filter element insertion, the clean side of the filter medium is not protected at all. In practice, this time period depends on the workshop operator and can be fairly long, up to several hours or even days if the operator removes the protecting component very early.

This issue is all the more important as particles located downstream from the filter medium are carried further downstream and can reach other components, which can damage the injectors—if the filtered liquid is fuel—or the bearings and roller cam—if the filtered liquid is oil.

It therefore appears that, from several standpoints, there is room for improvement in filter elements.

It is desirable to provide a technical solution which ensures an efficient protection of the filter element—especially the clean side of said filter element—against external contamination.

According to an aspect of the invention, a filter element is provided comprising:

a filter medium having an axis and forming a channel extending substantially axially;

a first and a second end plates, each end plate covering one axial end of the filter medium and being sealingly mounted on said axial end, the first end plate having an central opening substantially coaxial and in fluid communication with the channel.

Said filter element is designed to be placed in a filter housing for forming a liquid filtering device, whereby a liquid to be filtered can flow along a liquid path through the filter medium towards the channel and out of the filter element through the central opening.

Said filter element further comprises a detachable plug whose position can change from an attached position to a detached position. In the attached position the detachable plug is attached to an immobile portion of the filter element and seals the central opening. In the detached position the detachable plug is detached from said immobile portion of the filter element. In the detached position the detachable plug is also movable away from said central opening inside the channel and along the filter element axis to unseal said central opening.

Said immobile portion is defined as immobile with respect to the filter medium.

More precisely, the filter element and the detachable plug are designed such that the detachable plug is detached from said immobile portion of the filter element to be moved inside the channel towards the second end plate up to an end position which is located at a distance from the central opening when an axial pushing force is exerted on the detachable plug by an axial member of the filter housing during insertion of the filter element in the filter housing.

By the provision of a detachable plug closing the central opening of the channel, i.e. the clean side of the filter medium, which is moved to free up the central opening by means of an axial member of the filter housing, the invention ensures the central opening remains closed until the very moment when filter element is inserted into the filter housing. As a result, protection against contamination is greatly improved. It has to be noted that the sealing effect of the detachable plug concerns dust and particles but does not necessarily include liquids such as water or gases. A sealing member may further be provided between the detachable plug and the first end plate.

Besides, the movement of the detachable plug being automatically achieved during the insertion of the filter element in the filter housing, this step of filter element change is more practical for the operator and further reduces the risks of contamination by the operator's fingers. Moreover, insofar as the outer side of the detachable plug, which can have been contaminated, is in contact with the free end of the axial member, possible contaminants can be trapped between the detachable plug and the axial member.

An important feature of the invention is that in the detached position the detachable plug is movable inside the channel from the central opening up to an end position where the detachable plug is located at a distance from the central opening and where the detachable plug is entirely contained in the channel. Preferably, said end position is located at a distance from the central opening which is greater than half the filter element height, along the filter element axis. This ensures that the filtration can take place over a large height—i.e. along the axis—of the filter medium, in order not to jeopardize the filtration flow. In an embodiment, the end position can be located at a distance from the central opening which is greater than three-quarters of the filter element height.

The connection can be configured such that at said end position the detachable plug is in axial contact with the second end plate. Thus, the filtration can take place over the whole filter medium height without impair the liquid flow in the channel.

For example, the detachable plug can be attached to said immobile portion of the filter element via at least one of: a snap-in connection, a force fitting connection, a breakable connection.

Preferably, the change of position from the attached position to the detached position of the detachable plug is irreversible. In other words, the detachable plug can't be reattached to the immobile portion once it has been detached.

Preferably, the channel comprises an inner perforated wall that is realized by a central perforated rigid tube that axially extends between the first and the second end plates.

Preferably, said immobile portion of the filter element is the first end plate or is the axial end of the central perforated rigid tube that is on the side of the central opening.

The detachable plug comprises an elongated portion that extends axially inside the channel to guide the detachable plug in the central perforated rigid tube during its motion from the central opening up to the end position.

In an embodiment, the central perforated rigid tube comprises at least one guiding surface arranged inside the central perforated rigid tube to guide the detachable plug during its motion from the central opening up to the end position.

Preferably, said at least one guiding surface is a helical path arranged on an inner surface of the central perforated rigid tube and the detachable plug comprises at least one corresponding guiding element designed to be guided in said helical path during the motion of the detachable plug from the central opening up to the end position.

More precisely, the helical path being designed such that an axial push exerted on the detachable plug towards the second end plate entails a rotational movement and an axial movement of the detachable plug along the helical path.

More preferably, said helical path is realized by a helical groove arranged on an inner surface of the central perforated rigid tube and said guiding element is realized by at least one radially protruding pin arranged on the detachable plug, designed to be guided in the helical groove. Alternatively, said helical path can be realized by a helical rib arranged on an inner surface of the central perforated rigid tube and said guiding element is realized by at least one corresponding notch arranged on the detachable plug and that is designed to receive the rib.

Advantageously, before the first insertion of the filter element in the filter housing, the detachable plug is recessed with respect to the outer face of the first end plate or is substantially level with the outer face of the first end plate. In other words, the detachable plug does not protrude outside the filter element, and thus is less likely to be caught in a surrounding element or to hold dust.

In a variant, the detachable plug comprises a portion which protrudes outside the filter element, before the first insertion of the filter element in the filter housing. Such a protruding portion may be used to receive an end portion of the axial member, thereby improving the contact between the detachable plug and the axial member and the guiding ability of the axial member. As a consequence, the portion of the detachable plug located inside the channel, before the first insertion of the filter element in the filter housing, can have a fairly small size, without a risk that the detachable plug, pushed inside the channel, becomes tilted and jammed in the channel.

In preferred embodiment, the detachable plug comprises a concave portion which faces outwards of the filter element, and which is designed to receive an end portion of the axial member of the filter housing. Thus, the possible contaminants on the "dirty" side of the detachable plug can be trapped between the detachable plug and the axial member, especially if the concave portion of the detachable plug and end portion of the axial member have fitting shapes.

If a corresponding convex shape is formed at the free end of the axial member, during motion of the detachable plug from the central opening to the end position an axial abutment of the convex shape against the concave shape lead to a better guiding of the detachable plug in the channel.

In a further improvement, the detachable plug is hollow and comprises an axial opening which opens outwards of the filter element and at least one radial opening that is in liquid communication with said axial opening via the inside of the hollow detachable plug. Thanks to this arrangement and provided that the axial member of the filter housing is designed with an axial opening at its free end that is in axial abutment with the detachable plug, when the filter element is mounted in the filter housing the filtered liquid can flow out through the radial opening and then through said axial opening of the detachable plug before flowing out the filter housing via the axial member.

According to a second aspect, the invention concerns a liquid filtering device comprising:
 a filter element as previously described;
 a casing receiving the filter element and including:
 a filter housing having a bottom wall, a peripheral wall, a main open at its axial end opposite the bottom wall, and an axial member which is configured to be inserted in the filter element channel and to push the detachable plug inside said channel towards the second end plate during the first insertion of the filter element in the filter housing;
 a filter cover removably secured to the filter housing at its main open,
 the assembly consisting of or comprising the axial member and the detachable plug comprising at least one hole for allowing the liquid to flow from the outside of the assembly towards the inside.

Advantageously, the axial member of the filter housing is a tube protruding from the bottom wall substantially axially and forming a liquid pipe, preferably a liquid outlet of the liquid filtering device.

Preferably, said at least one hole is a radial hole arranged in the peripheral wall of the axial member. Indeed, the axial member may have an open free end—opposite the bottom wall of the filter housing—but said open free end may generally be closed by the detachable plug in use. A plurality of radial holes may be provided in the tube peripheral wall. Alternatively or in addition, at least one radial hole can be provided in the detachable plug. In the latter case the axial member comprises an open free end.

In an embodiment, the axial member further comprises a shutter which is arranged at or near the axial end of the axial member which is opposed to the bottom wall of the filter housing. The shutter can move with respect to the filter housing:
 from a closed position, in which the shutter faces the radial hole so as to close it;
 to an open position, in which the shutter is offset from the radial hole, thereby allowing a liquid to flow through said hole;
 the movement of shutter from its closed position to its open position being automatically caused by the insertion of the filter element in the filter housing; the shutter is arranged on or in the axial member such that, during the first insertion of the filter element in the filter housing, it pushes the detachable plug inside said channel towards the second end plate.

Such an implementation is advantageous in that it further allows protecting the clean part of the filter housing.

In case several radial holes are provided, preferably the shutter is configured to close each radial hole, or several shutters are provided so that each radial hole can be closed. The hole can be arranged in a portion of the axial member located near the free end—i.e. the end opposite to the bottom wall of the filter housing.

According to a first embodiment, the shutter is configured to move axially with respect to the filter housing, towards the bottom wall of the filter housing, from the closed position towards the open position, and in that the axial member comprises elastic means arranged to urge the shutter towards its closed position, the liquid filtering device being designed such that, when the detachable plug pushed by the the shutter abuts the second end plate, further inserting movement of the filter element into the filter housing causes the detachable plug to move the shutter towards its open position, against the force exerted by the elastic means.

According to a second embodiment, the shutter is configured to move along a helical path arranged on an inner surface of the axial member, away from the bottom wall of the filter housing, from the closed position towards the open position, and in that the detachable plug and the shutter comprise corresponding attaching or stopping means, to prevent rotation of the shutter with respect to the detachable plug, such that an axial push exerted by the shutter on the detachable plug towards the second end plate, due to the insertion of the filter element in the filter housing, entails a rotational movement and axial movement of the detachable plug along the helical path arranged in the central perforated rigid tube of the filter element, further causes a rotation movement and an axial movement of the shutter along the helical path arranged in the axial member and, consequently, a movement of said shutter towards its open position.

Preferably, the helical path arranged in the axial member has a screw thread smaller than the screw thread of the helical path arranged in the central perforated rigid tube of the filter element.

Advantageously, stopping means are realised by notches and corresponding protruding portions that engage said notches when the shutter is in axial abutment against the detachable plug.

In a preferred embodiment, the detachable plug has a coupling portion, opposite the second end plate, and in that the axial member of the filter housing has a coupling portion arranged at its end opposite the filter housing bottom wall and configured to cooperate with the coupling portion of the detachable plug. Such a cooperation makes the pushing action easier and allows the axial member to better guide the detachable plug movement.

The coupling portion on the detachable plug can have a concave shape which faces outwards of the filter element, and in that the coupling portion on the axial member has a corresponding convex shape that fits said concave shape. Such fitting shapes improves the cooperation between the axial member and the detachable plug and therefore allows the axial member to even better guide the detachable plug movement. Moreover, the outside concave shape of the detachable plug, which can have contaminants therein, is covered by the convex shape of the axial member during insertion, resulting in the contaminants being trapped and not free in the clean area of the filter element. In this embodiment, a radial hole has to be provided in the axial member to allow the liquid to flow.

According to a third embodiment, the invention concerns a vehicle which comprises a liquid filtering device as previously described, the liquid filtering device being designed to filter a liquid such as fuel or oil.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIGS. 3 and 4 are schematic and detailed views of a filter element according to variants of FIG. 2a;

DETAILED DESCRIPTION

Figure 1A:
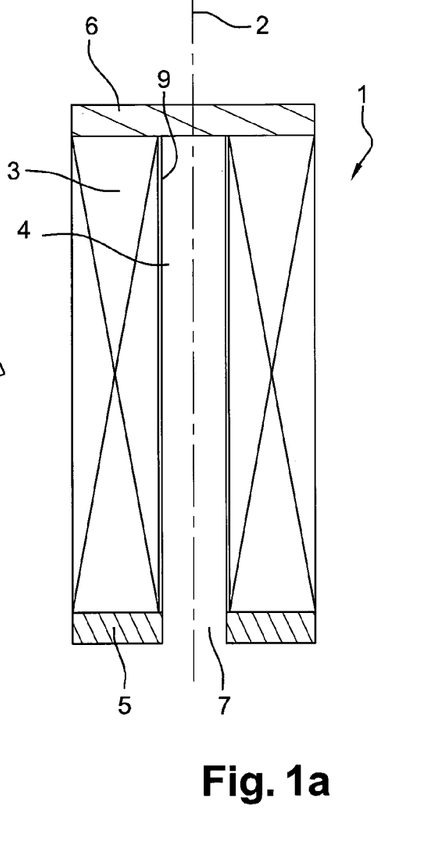
FIGS. 1a, 1b and 1c schematically show a filter element, a filter housing and a filter cover, respectively, for forming a conventional and known liquid filtering device.

As illustrated in FIG. 1a, a conventional filter element 1, having an axis 2, comprises a filter medium 3 forming a channel 4 extending substantially axially. The filter medium 3 can be made of a sheet of cellulosic material folded so as to have, in cross section, the shape of a star having a plurality of branches.

The filter element 1 further comprises a first and a second end plates 5, 6, each end plate covering one axial end of the filter medium 3 and being sealingly mounted on said axial end. The first end plate 5 has a central opening 7 substantially coaxial and in fluid communication with the channel 4.

The channel 4 may include a central perforated rigid tube 9 that radially supports the filter medium to prevent the filter medium 3 from flattening due to the liquid flow through it.

Figure 2A:
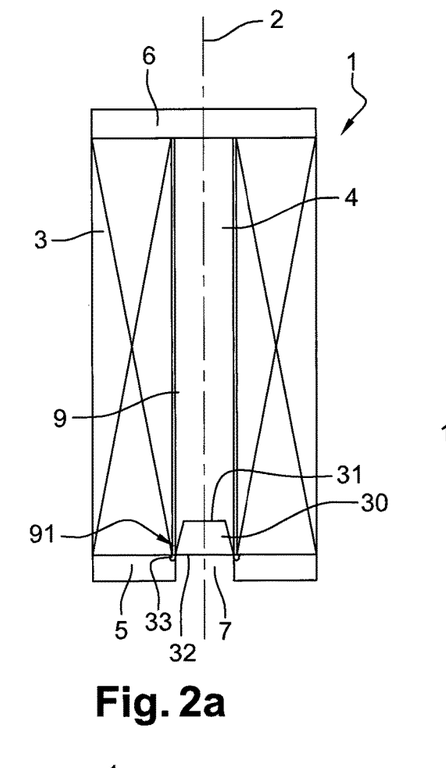
FIG. 2a is a schematic view of a filter element including a detachable plug, according to a first embodiment of the invention, before its first use.
Figure 2B:
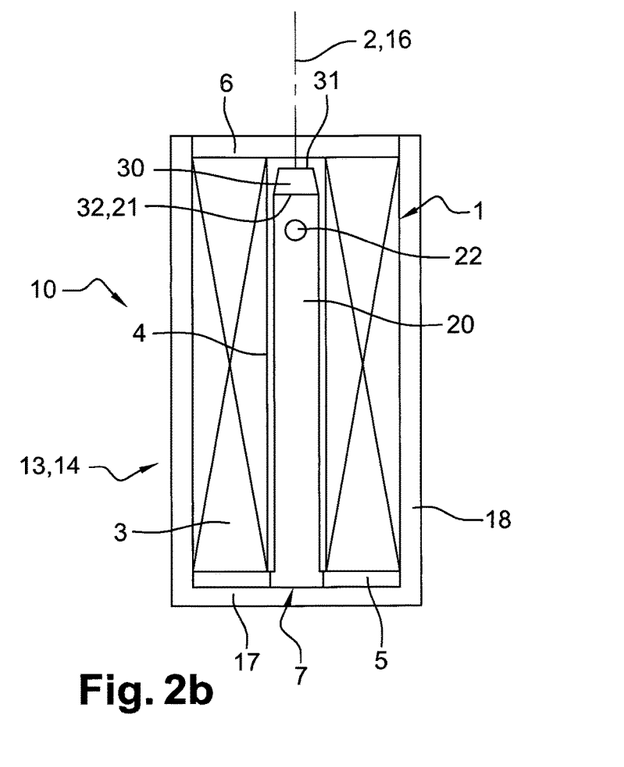
FIG. 2b shows the filter element of FIG. 2a inserted in a filter housing.

The filter element 1 is designed to be placed substantially coaxially in a casing 13 including a filter housing 14 and a filter cover 15, for forming a liquid filtering device 10 as shown for example on FIG. 2b (without the filter cover). Such a liquid filtering device 10 can be implemented in a vehicle, to filter a liquid such as fuel or oil.

Figure 1B:
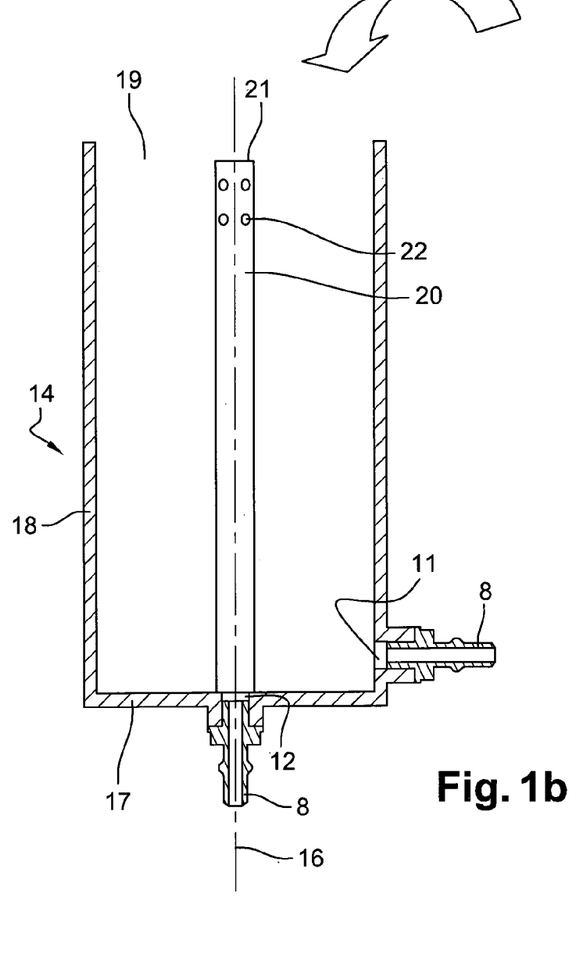
Figure 1C:
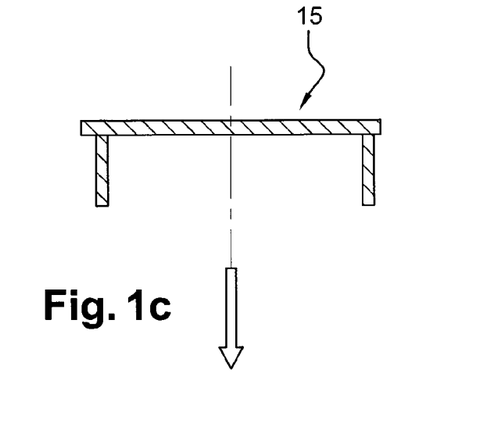

As illustrated in FIG. 1b, the filter housing 14, which is generally cylindrical, has an axis 16 and comprises a bottom wall 17, a peripheral wall 18, and an open axial end 19 opposite the bottom wall 17. The filter cover 15, shown in FIG. 1c, is removably secured to the filter housing 14 at its open axial end 19. For example, the filter cover 15 comprises a disc-like plate and a skirt provided with an external thread for cooperation with an internal thread of the peripheral wall 18 of the filter housing 14.

Two ports 11, 12 are arranged in the casing 13, one port being an inlet for the liquid to be filtered, the other one being an outlet for the filtered liquid. A pipe 8 can be sealingly mounted in fluid communication with each of the ports 11, 12 for carrying the liquid to be filtered/once filtered. In the illustrated embodiment, the ports 11, 12 are arranged in the filter housing 14. Alternatively the ports 11, 12 can be arranged in the cover 15.

The filter housing 14 further comprises an axial member 20 which is configured to be inserted in the filter element channel 4 via said central opening 7. The axial member 20 extends from the bottom wall 17 up to its free end 21 over an axial distance that is slightly lower than the axial height of the peripheral wall 18. The axial member 20 may be a tube or rigid core, and generally comprises at least one radial hole 22 arranged in its peripheral wall preferably arranged near the free end 21. When the axial member is a tube that protrudes from the bottom wall 17, it forms a liquid pipe, preferably a liquid outlet of the liquid filtering device 10.

The filter element 1 is designed to be mounted in the filter housing 14, with the channel 4 receiving the axial member 20. Then, the filter cover 15 can be mounted on the filter housing 14 to close the casing 13 and form the liquid filtering device 10. The central opening 7 is then in fluid communication with one of the ports 11, 12 of the casing 13, namely the outlet port 12.

In use, a liquid to be filtered—such as fuel or oil—flows from the inlet 11 of the casing 13 through the filter medium 3, from the outside of the filter medium 3 towards the channel 4, and then out of the filter element 1 through the axial member 20, and ultimately out of the liquid filtering device 10 through the outlet 12. As the end plates 5, 6 are sealingly mounted on the filter medium 3, the inside and the outside of the filter medium 3 are not in fluid communication, except through the filter medium 3.

When the filter medium 3 has become clogged, the filter cover 15 is opened, the filter element 1 is removed from the filter housing 14, and a new filter element 1 is inserted in the filter housing 14. Because of the central opening 7, particles, dust, etc. can enter the channel 4 and contaminate the filter medium 3 of the new filter element 1 according to prior art, on its clean side, which would be detrimental to the filtration quality and could damage downstream components.

The invention provides a solution for preventing the clean side of the new filter element to be contaminated before it is inserted in the filter housing, as will now be described.

To that end, according to a general definition, the invention provides a detachable plug 30 which is positioned to seal the central opening 7 before the first insertion of the filter element 1 in the filter housing 14. The detachable plug 30 is preferably positioned in the central opening 7 so as to seal it, before the first insertion of the filter element 1 in the filter housing 14.

More precisely, before the first insertion of the filter element 1 in the filter housing the detachable plug 30 is in an attached position where it is attached on the first end plate 5 or in, a variant, attached at the axial end 91 of the central perforated rigid tube 9 and that is on the side the central opening 7. In the attached position, the detachable plug 30 seals the central opening 7 and can't move. During insertion of the filter element 1 in the filter housing 14, the detachable plug 30, pushed by the axial member 20 towards the inside of the filter element 1, is detached from the first end plate 5 or from the central perforated rigid tube 9 and move away from the central opening 7 inside the filter channel 4 and along the filter element axis 2 to unseal the central opening 7.

Preferably, the change of position from the attached position to the detached position of the detachable plug 30 is irreversible. In other words, the detachable plug 30 can't be reattached to the first end plate 5 or to the central perforated rigid tube 9 from which it has been previously detached.

The detachable plug 30 has an inner face 31, facing the channel 4, and an opposite outer face 32. The detachable plug 30 can be made of a plastic material, or a fairly rigid elastomeric material.

More precisely, the detachable plug 30 is configured to be detached and pushed inside the channel 4 towards the second end plate 6 by the axial member 20 of the filter housing 14, during the first insertion of the filter element 1 in the filter housing 14. The connection between the detachable plug 30 and the filter element 1 is configured to allow, in the detached position of the detachable plug 30, the motion of the detachable plug 30, up to an end position which is located at a distance from the central opening 7 where the detachable plug is entirely contained in the channel 4. Preferably, the motion of the detachable plug 30 is allowed up to an end position which is located at a distance from the central opening 7 which is preferably greater than half the filter element height along the filter element axis 2. More preferably, the detachable plug 30 can be moved by the axial member 20 substantially up to the second end plate 6, i.e. substantially over the whole height of the filter element 1.

A first embodiment of the invention is illustrated in FIGS. 2a and 2b.

The detachable plug 30 is placed in the central opening 7 so as to close it. It may be force-fitted or snapped in the filter element 1, for example on the first end plate 5 or in a variant (not represented) at the axial end 91 of the central perforated rigid tube 9 that is nearest the central opening 7. An annular gasket 33 may be provided between the detachable plug 30 and the first end plate 5 or between the detachable plug 30 and the central perforated rigid tube 9 to improve sealing. The detachable plug 30 may integrally be housed in the filter element 1, meaning that no portion of the detachable plug 30 protrudes outside of the filter element 1.

When the filter element 1 is inserted in the filter housing 14, the free end 21 of the axial member 20 comes into contact with the outer face 32 of the detachable plug 30, and the axial member 20 pushes the detachable plug 30 axially, towards the second end plate 6. The force exerted is high enough to detach, in other words to separate, the detachable plug 30 from the first end plate 5. The detachable plug 30, which is then free to move inside the channel 4, is pushed by the axial member 20 of the filter housing 14. In the illustrated embodiment, the axial member 20 is long enough to push the detachable plug 30 substantially up to the second end plate 6, when the filter element 1 is fully inserted in the filter housing 14, as shown in FIG. 2b. However, other implementations could be envisaged, provided the detachable plug 30 is far enough from the first end plate 5 (namely located at least halfway between the end plates 5, 6) to not impede too much liquid flow in the channel 4.

In case the free end 21 of the axial member 20 is open, it may not allow liquid to flow towards the axis 16 because it may be closed by the detachable plug 30. With such a configuration, radial holes 22 are required in the axial member (FIG. 2b) or, in a variant, in the detachable plug 30 (radial holes 37, FIG. 4), to allow the liquid flowing in the liquid filtering device 1.

Figure 3:
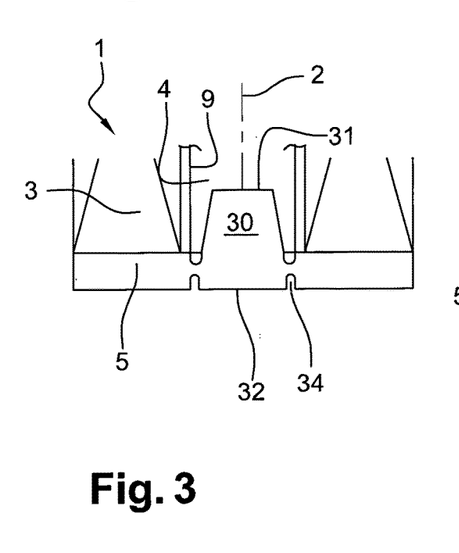

According to a variant shown in FIG. 3, the detachable plug 30 may be attached to the first end plate 5 by a breakable connection. More specifically, the detachable plug 30 and the first end plate 5 may form one and a single piece before the first insertion of the filter element 1 in the filter housing 14, a weak zone being provided around the detachable plug 30. Such a weak zone may be an annular zone 34 having a lower thickness. When the filter element 1 is inserted in the filter housing 14, the axial member 20 pushes the detachable plug 30, causing the weak zone 34 to break. The detachable plug 30 is then detached from the remaining annular portion forming the first end plate 5, and the central opening 7 is formed. The detachable plug 30 is then free to move inside the channel 4, due to the pushing force of the axial member 20.

Figure 4:
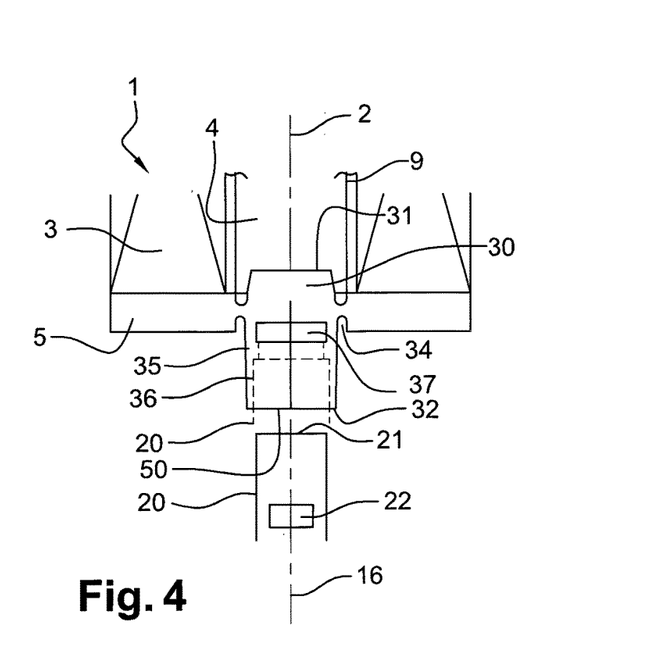

Another variant is shown in FIG. 4. Contrary to FIGS. 2a and 3, in which the detachable plug 30 is recessed with respect to or substantially level with the outer face of the first end plate 5 in its closed position, the detachable plug 30 in the embodiment of FIG. 4 comprises a portion 35 which protrudes outside the filter element 1, before the first insertion of the filter element 1 in the filter housing 14.

Such an outward protruding portion 35 may provide a guiding mean for the movement of the detachable plug 30 resulting from the axial pushing force exerted by the axial member 20 of the filter housing 14. To that end, the portion 35 may also comprise a concave portion 36, such as a cylindrical recess, which faces outwards of the filter element 1, and which is designed to receive the free end 21 of the axial member 20 (as shown in dotted line). Consequently, the portion of the detachable plug 30 which is located inside the channel 4 in the closed position can have a fairly small height. Indeed, the risk for the detachable plug 30 to become jammed in the channel 4—because of its small height—is low, insofar as the detachable plug 30 is efficiently guided along the axis 2 by the axial member 20 cooperating with the protruding portion 35.

With such a configuration, at least one radial hole 22 of the axial member 20 has to be located outside of the concave portion 36 when the axial member 20 and the detachable plug 30 cooperate, to provide a liquid passageway. Alternatively or in addition, the concave portion 36 may define in the protruding portion 35 of the detachable plug 30 an axial hole that opens outwards of the filter element through an axial opening 50 and at least one radial hole 37 could be provided in the detachable plug 30 that is in liquid communication with the axial opening 50 through the inside of the of the detachable plug 30, i.e. through said axial hole. Such a radial hole 37 is preferably arranged in the outward protruding portion 35, thereby not providing an access for contaminants towards the clean side of the filter element 1 when the detachable plug 30 is in the closed position.

Although the connection between the detachable plug 30 and the first end plate 5 is illustrated in FIG. 4 as a breakable connection, the detachable plug 30 could alternatively be force fitted or snapped in the central opening 7.

A second embodiment of the invention is illustrated in FIGS. 5a-5d.

The filter element 1 and the detachable plug 30 may be substantially identical to the embodiment of FIG. 2a.

As regards the filter housing 14, the axial member 20 comprises at least one hole 22, and the axial member 20 further comprises a shutter 40 capable of closing this hole 22. More precisely, the shutter 40 is arranged at or near the free end 21 of the axial member 20 and can move with respect to the filter housing 14:

from a closed position, in which the shutter 40 faces the hole 22 so as to close it;

to an open position, in which the shutter 40 is offset from the hole 22, thereby allowing a liquid to flow through said hole 22.

A plurality of holes 22 could be provided in the axial member 20. In this case, the shutter 40 would be designed so as to close all holes, or several shutters would be provided so that all holes could be closed.

In the illustrated embodiment, the hole 22 is located near the free end 21 of the axial member 20. Besides, the shutter 40 is mounted in the axial member 20, near the free end 21 thereof. The shutter 40 comprises a closing portion 41, which can have a cylindrical outer face fitting with the inner face of the axial member 20, and an actuating portion 42 protruding from the closing portion 41 away from the filter housing bottom wall 17.

Figures 5A, 5B, 5C:
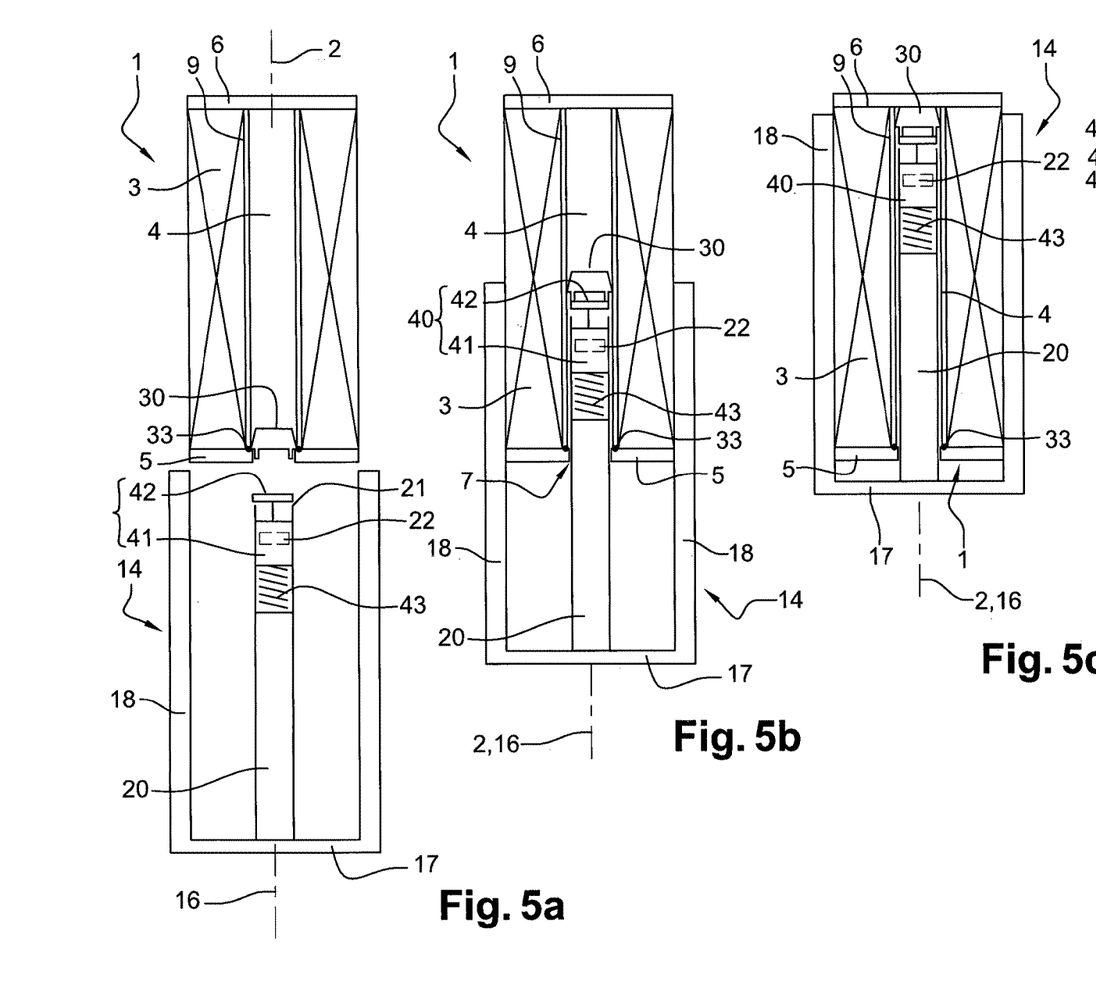
FIG. 5a-5d show successive steps of the insertion of a filter element including a detachable plug in a filter housing, according to a second embodiment of the invention.
Figure 5D:
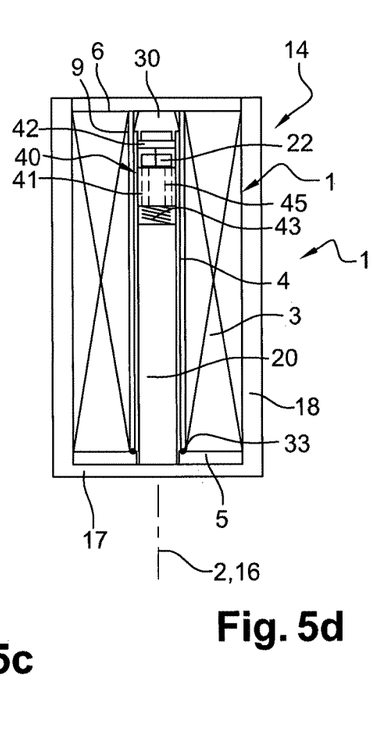

The shutter 40 is configured to move axially with respect to the axial member 20:

from a position in which it extends at least partially beyond the free end 21 of the axial member 20, which corresponds to the closed position, the closing portion 41 facing the hole 22 (see FIG. 5a);

towards the bottom wall 17 of the filter housing 14, to an at least partially retracted position, which corresponds to the open position, the closing portion 41 being offset from the hole 22 (see FIG. 5d).

Preferably, the filter housing 14 further comprises elastic means 43, such as for instance a spring, arranged to urge the shutter 40 towards its closed position.

At the beginning of the insertion of the filter element 1 in the filter housing 14, the detachable plug 30 comes into contact with the shutter 40, more precisely with the actuating portion 42 of the shutter 40. Further insertion leads to the detachable plug 30 detaching from the filter element 1 and being pushed towards the second end plate 6, while the elastic means 43 still maintain the shutter 40 in its closed position (FIG. 5b). In other words, the elastic means 43 are dimensioned not to compress, or to only slightly compress, when the detachable plug 30 is detached from the filter element 1 and pushed by the axial member 20, as long as the detachable plug 30 has not come into contact with the second end plate 6 of the filter element 1.

When the detachable plug 30 pushed by the axial member 20 abuts the second end plate 6, as shown in FIG. 5c, further inserting movement of the filter element 1 into the filter housing 14 causes the detachable plug 30 to push the actuating portion 42 towards the bottom wall 17 of the filter housing 14, i.e. to move the shutter 40 towards its open position, against the force exerted by the elastic means 43. In other words, the movement of shutter 40 from its closed position to its open position is automatically caused by the insertion of the filter element 1 in the filter housing 14.

When the filter element 1 is fully inserted in the filter housing 14 (FIG. 5*d*), the shutter 40 is in its open position, and the radial hole 22 is free, making it possible for a filtered liquid to flow out of the liquid filtering device 10.

When the filter element 1 is removed from the filter housing 14, the shutter 40 automatically returns to its closed position, due to the elastic means 43, thereby protecting the space inside the axial member 20 from contaminants.

A third embodiment of the invention is illustrated in FIGS. 6*a*-6*d*.

The filter element 1 is provided with a helical path 48 arranged on an inner face of the channel 4, such as a groove. In an implementation, the helical path 48 is preferably arranged in the central perforated rigid tube 9 of the channel 4 when the the central perforated rigid tube 9 is provided. Besides, the detachable plug 30 comprises a guiding element 38 designed to be guided in the helical path 48, such as a radially protruding pin 38. The helical path 48 is "reversible", i.e. is such that an axial push exerted on the detachable plug 30 towards the second end plate 6 entails a rotation and an axial movement of the detachable plug 30 along the helical path 48 towards the second end plate 6.

In other words, in this embodiment, when the detachable plug is in its detached position i.e. detached from first end plate 5 or from the central perforated rigid tube 9, the detachable plug 30 remains connected to the filter element 1 via the helical path 48 and can't move freely in the channel 4 because during its motion it is guided by the helical path 48.

The axial member 20 may comprise a single radial hole 22 which, in the exemplary embodiment, is located near the free end 21 of the axial member 20. The filter housing 14 further comprises a shutter 50 capable of closing this radial hole 22. More precisely, the shutter 50 is mounted on the axial member 20 near its free end 21 and can move with respect to the filter housing 14:

from a closed position, in which the shutter 50 faces the radial hole 22 so as to close it;

to an open position, in which the shutter 50 is offset from the radial hole 22, thereby allowing a liquid to flow through said radial hole 22.

A plurality of holes 22 could be provided in the axial member 20. In this case, the shutter 50 would be designed so as to close all holes, or several shutters would be provided so that all holes could be closed.

Figures 6A, 6B, 6C:
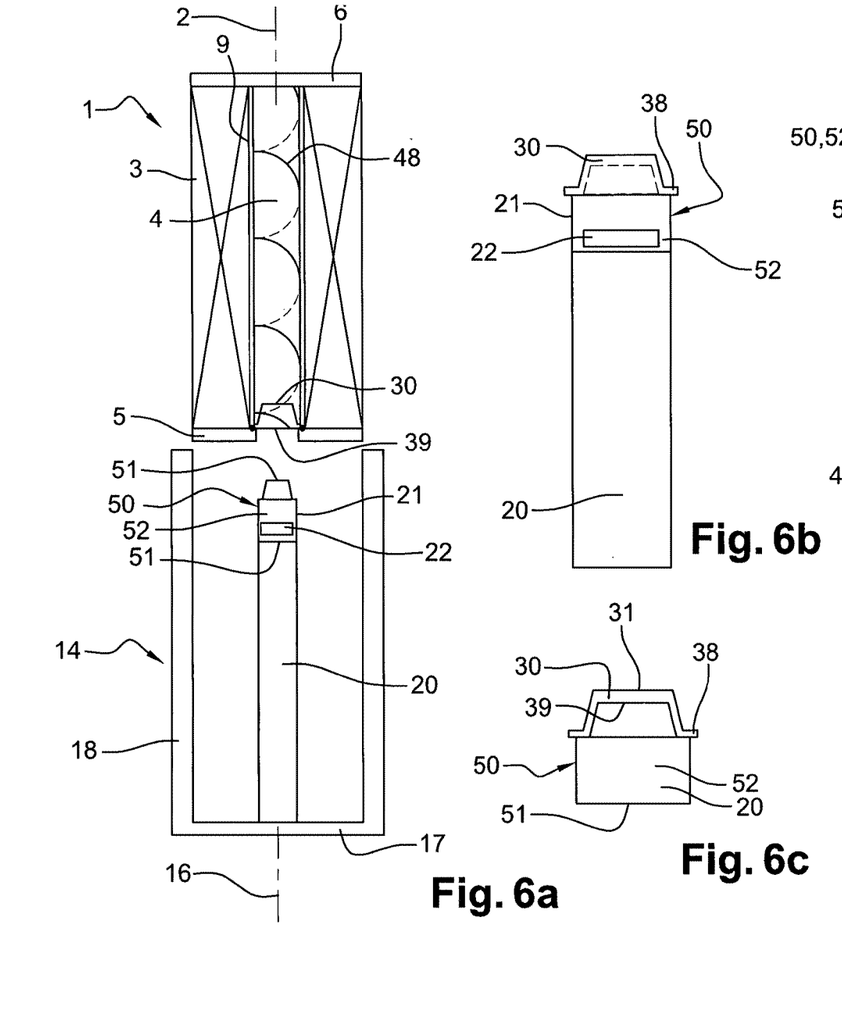
FIG. 6a is a schematic view of a filter element including a detachable plug and a filter housing including an axial member, according to a third embodiment of the invention.
FIGS. 6b and 6c schematically show the cooperation between the axial member of the filter housing and the detachable plug of the filter element, respectively according to a side view and according to a section.
Figure 6D:
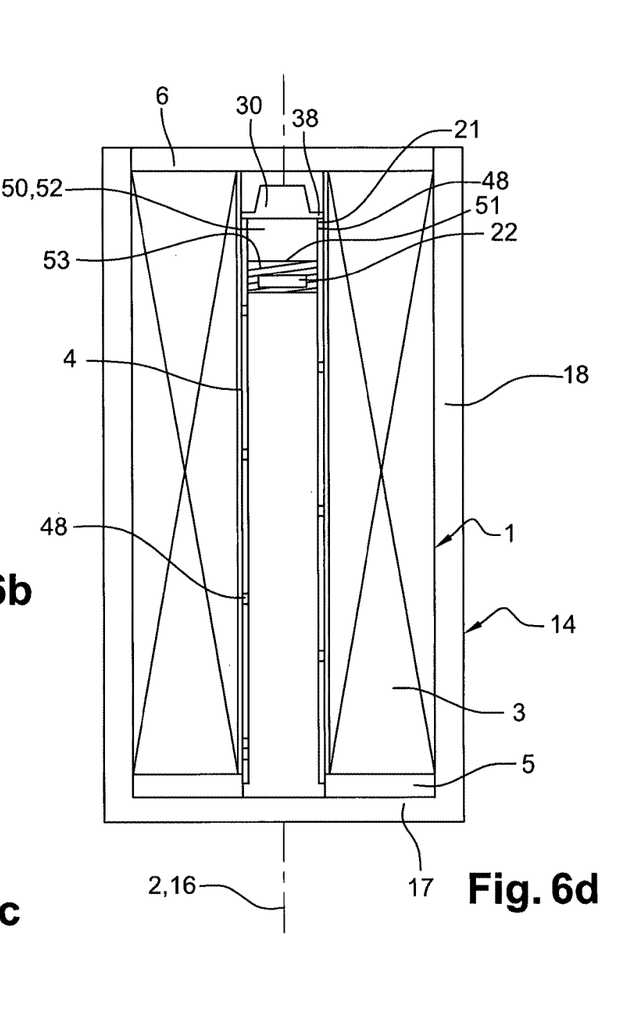
FIG. 6d shows the filter element and the filter housing of FIG. 6a in the inserted position.

The shutter 50 is mounted in the axial member 20, near the free end 21 thereof. It is configured as a cover having an axial end 51 and a peripheral wall 52 which for example fits the inner surface of the axial member 20. Furthermore, the shutter 50 is configured to move along a helical path 53 arranged in the axial member 20:

from the closed position, in which the peripheral wall 52 faces the hole 22 (see FIG. 6*a*), and the axial end 51 can be in contact with an axial abutment of the axial member 20;

away from the bottom wall 17 of the filter housing 14, to an at least partially extended position, which corresponds to the open position, the peripheral wall 52 being offset from the hole 22 (see FIG. 6*d*).

Figure 7A:
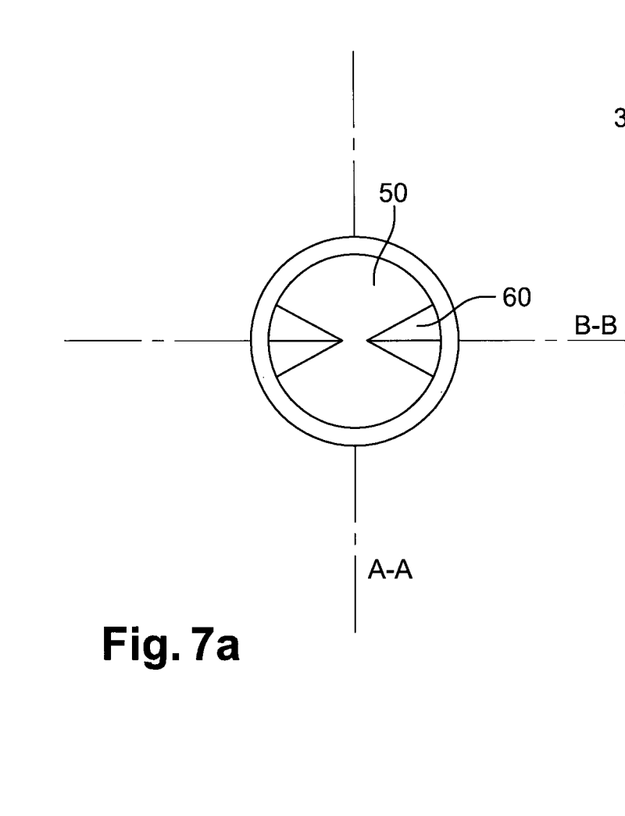
FIG. 7a is a schematic view showing stopping means formed on a shutter.
Figure 7B:
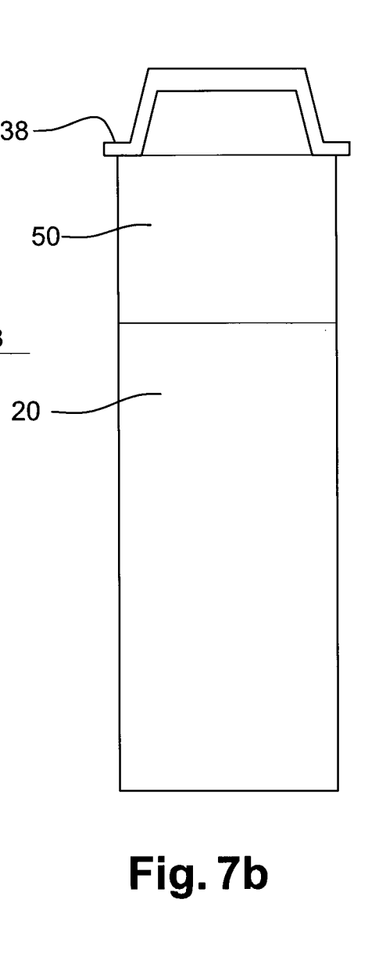
FIG. 7b is a cross-sectional view, according A-A cut of FIG. 7a, showing the shutter of FIG. 7a located at the free end of an axial member protruding from the bottom of a filter housing, wherein the shutter is in axial abutment against a detachable plug of a filter element
Figure 7C:
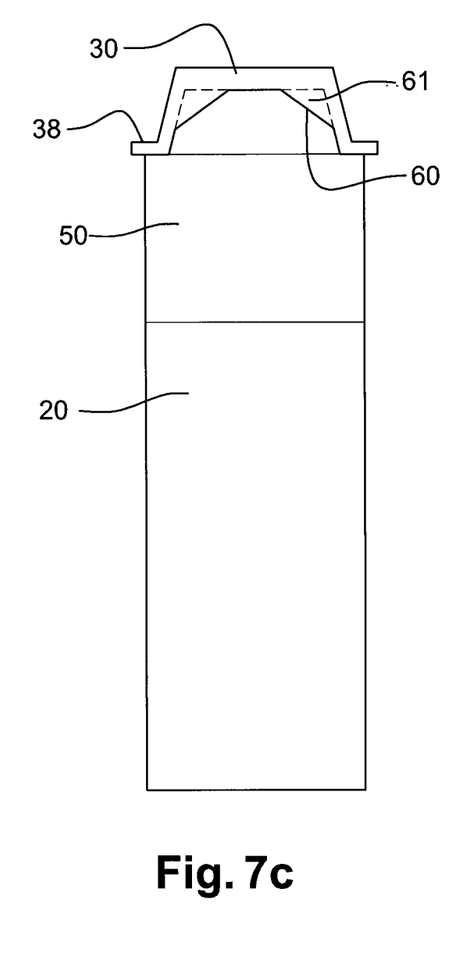
FIG. 7c is a cross-sectional view, according B-B cut of FIG. 7a, showing the detachable plug and the axial member of FIG. 7b that are prevented to rotate in relation to each other by the use of stopping means.

When the filter element 1 is inserted in the filter housing 14, the detachable plug 30 comes into axial abutment with the shutter 50, which is in the closed position. In this embodiment, the detachable plug 30 and the shutter 50 comprise corresponding attaching or stopping means 60, 61 providing a rotationally fixed attachment. Stopping means 60, 61, such as represented on FIGS. 7*a* and 7*c*, can be realised by notches 60, for instance arranged on the shutter 50, and corresponding protruding portions 61, for instance arranged on the concave surface 39 of the detachable plug 30, that engage said notches 60 when the shutter 50 is in axial abutment against the detachable plug 30.

Further insertion of the filter element 1 in the filter housing 14 corresponds to an axial push exerted by the axial member 20, through the shutter 50, on the detachable plug 30 towards the second end plate 6. This entails a rotational movement and an axial movement of the detachable plug 30 along the helical path 48 provided in the channel 4, towards the second end plate 6. Moreover, because the detachable plug 30 and the shutter 50 are linked in rotation, the rotation movement of the detachable plug 30 also causes a rotation of the shutter 50 about the filter element axis 2. Consequently and moving along the helical path 53 provided on the axial member 20, the shutter 50 also moves axially, thereby moving towards its open position (FIG. 6*d*) and freeing the radial hole 22. In other words, the movement of shutter 50 from its closed position to its open position is automatically caused by the insertion of the filter element 1 in the filter housing 14.

Preferably, the helical path 53 arranged in the axial member 20 has a screw thread smaller than the screw thread of the helical path 48 arranged in the central perforated rigid tube 9 of the filter element.

The helical path 53 provided on the axial member 20 is further configured to prevent the shutter 50 from returning spontaneously to its closed position, when the liquid filtering device 1 is in use. Alternatively, locking means can be provided to lock the shutter 50 in its open position.

Advantageously, the detachable plug 30 can have a coupling portion designed to receive and cooperate with the end portion 21 of the axial member 20, also forming a coupling portion.

In the illustrated embodiment, the coupling portions of the detachable plug 30 and of the axial member 20 have fitting shapes, namely respectively an outwardly facing concave portion 39 and a convex shape of the shutter 50. As shown in FIG. 6*c*, this entails an efficient cooperation between the detachable plug 30 and the axial member 20, improving the movement guidance. This also allows trapping possible contaminants between the detachable plug 30 and the axial member 20, so that these contaminants cannot be carried by the filtered liquid.

Such an advantageous configuration of the coupling portions is not limited to the embodiment shown in FIGS. 6*a*-6*d*, but could be implemented in other embodiments, such as the embodiment of FIG. 2*a*, for example.

It is to be understood that the present invention is not limited to the embodiments described above and illustrated in the drawings; rather, the skilled person will recognize that many changes and modifications may be made within the scope of the appended claims.

The invention claimed is:

1. A filter element comprising: a filter medium having an axis and forming a channel extending substantially axially; a first and a second end plates, each end plate covering one axial end of the filter medium and being sealingly mounted on the axial end, the first end plate having a central opening substantially coaxial and in fluid communication with the channel; the filter element being designed to be placed in a filter housing for forming a liquid filtering device, whereby a liquid to be filtered can flow along a liquid path through the filter medium towards the channel and out of the filter element through the central opening, wherein the filter element further comprises a detachable plug whose position can irreversibly change from an attached position to a detached position, wherein in the attached position the detachable plug is attached to an immobile portion of the filter element and seals the central opening, and wherein in the detached position the detachable plug is detached from the immobile portion and is movable away from the central opening inside the channel and along the filter element axis to unseal the central opening.

2. The filter element according to claim 1, wherein in the detached position the detachable plug is movable inside the channel from the central opening up to an end position where the detachable plug is located at a distance from the central opening and where the detachable plug is entirely contained in the channel.

3. The filter element according to claim 2, wherein the end position is located at a distance from the central opening which is greater than half the filter element height, along the filter element axis.

4. The filter element according to claim 2, wherein in the end position the detachable plug is in axial contact with the second end plate.

5. The filter element according to claim 2, wherein it is designed such that the detachable plug is detached from the immobile portion of the filter element to be moved inside the channel towards the second end plate up to the end position when an axial pushing force is exerted on the detachable plug by an axial member of the filter housing during insertion of the filter element in the filter housing.

6. The filter element according to claim 1, wherein the detachable plug is attached to the immobile portion of the filter element via at least one of a snap-in connection, a force fitting connection, a breakable connection.

7. The filter element according to claim 1, wherein the channel comprises an inner perforated wall that is realized by a central perforated rigid tube that extends axially between the first and the second end plates.

8. The filter element according to claim 1, wherein the immobile portion of the filter element is the first end plate.

9. The filter element according to claim 7, wherein the immobile portion of the filter element is the axial end of a central perforated rigid tube that is on the side of the central opening.

10. The filter element according to claim 2, wherein the channel comprises an inner perforated wall that is realized by a central perforated rigid tube that extends axially between the first and the second end plates, and the central perforated rigid tube comprises at least one guiding surface arranged inside the central perforated rigid tube to guide the detachable plug during its motion from the central opening up to the end position.

11. The filter element according to claim 10, wherein the at least one guiding surface is a helical path arranged on an inner surface of a central perforated rigid tube and the detachable plug comprises at least one corresponding guiding element designed to be guided in the helical path during a motion of the detachable plug from the central opening up to an end position.

12. The filter element according to claim 11, wherein the helical path being designed such that an axial push exerted on the detachable plug towards the second end plate entails a rotational movement and an axial movement of the detachable plug along the helical path.

13. The filter element according to claim 11, wherein the helical path is realized by a helical groove arranged on the inner surface of the central perforated rigid tube and the guiding element is realized by at least one radially protruding pin arranged on the detachable plug, designed to be guided in the helical groove.

14. The filter element according to claim 1, wherein, before the first insertion of the filter element in the filter housing, the detachable plug is recessed with respect to the outer face of the first end plate or is substantially level with the outer face of the first end plate.

15. The filter element according to claim 1, wherein the detachable plug comprises a portion which protrudes outside the filter element, before the first insertion of the filter element in the filter housing.

16. The filter element according to claim 1, wherein the detachable plug comprises a concave portion which faces outwards of the filter element, and which is designed to receive an end portion of an axial member of the filter housing.

17. The filter element according to claim 1, wherein the detachable plug is hollow and comprises an axial opening which opens outwards of the filter element and at least one radial opening that is in liquid communication with the axial opening via the inside of the detachable plug.

18. A liquid filtering device comprising: a filter element according claim 1; a casing receiving the filter element and including: the filter housing having a bottom wall, a peripheral wall, a main open at its axial end opposite the bottom wall, and an axial member which is configured to be inserted in the filter element channel and to push the detachable plug inside the channel towards the second end plate during the first insertion of the filter element in the filter housing; a filter cover removably secured to the filter housing at its main open, an assembly consisting of the axial member and the detachable plug comprising at least one hole for allowing the liquid to flow from the outside of the assembly towards the inside.

19. The liquid filtering device according to claim 18, wherein the axial member of the filter housing is a tube protruding from the bottom wall substantially axially and forming a liquid pipe, preferably a liquid outlet of the liquid filtering device.

20. The liquid filtering device according to claim 19, wherein the at least one hole is a radial hole arranged in the peripheral wall of the axial member.

21. The liquid filtering device according to claim 20, wherein the axial member further comprises a shutter which is arranged at or near the axial end of the axial member which is opposed to the bottom wall of the filter housing, wherein the shutter can move with respect to the filter housing: from a closed position, in which the shutter faces the radial hole so as to close it; to an open position, in which the shutter is offset from the radial hole, thereby allowing a liquid to flow through the hole; the movement of shutter from its closed position to its open position being automatically caused by the insertion of the filter element in the filter housing; the shutter is arranged on or in the axial member such that, during the first insertion of the filter element in the filter housing, it pushes the detachable plug inside the channel towards the second end plate.

22. The liquid filtering device according to claim 21, wherein the shutter is configured to move axially with respect to the filter housing, towards the bottom wall of the filter housing, from the closed position towards the open position, and in that the axial member comprises elastic means arranged to urge the shutter towards its closed position, the liquid filtering device being designed such that, when the detachable plug pushed by the shutter abuts the second end plate, further inserting movement of the filter element into the filter housing causes the detachable plug to move the shutter towards its open position, against the force exerted by the elastic means.

23. The liquid filtering device according to claim 21, wherein the shutter is configured to move along a helical path arranged on an inner surface of the axial member, away from the bottom wall of the filter housing, from the closed position towards the open position, and in that the detachable plug and the shutter comprise corresponding attaching or stopping means to prevent rotation of the shutter with respect to the detachable plug, such that an axial push exerted by the shutter on the detachable plug towards the second end plate, due to the insertion of the filter element in the filter housing, entails a rotational movement and axial movement of the detachable plug along the helical path arranged in a central perforated rigid tube of the filter element, further causes a rotation movement and an axial movement of the shutter along the helical path arranged in the axial member and, consequently, a movement of the shutter towards its open position.

24. The liquid filtering device according to claim 23, wherein the helical path arranged in the axial member has a screw thread smaller than the screw thread of the helical path arranged in a central perforated rigid tube of the filter element.

25. The liquid filtering device according to claim 23, wherein the stopping means are realised by notches and corresponding protruding portions that engage the notches when the shutter is in axial abutment against the detachable plug.

26. The liquid filtering device according to claim 18, wherein the detachable plug has a coupling portion, opposite the second end plate, and in that the axial member of the filter housing has a coupling portion arranged at its axial end opposite the filter housing bottom wall and configured to cooperate with the coupling portion of the detachable plug.

27. The liquid filtering device according to claim 26, wherein the coupling portion on the detachable plug has a concave shape which faces outwards of the filter element, and in that the coupling portion on the axial member has a corresponding convex shape that fits the concave shape.

28. The liquid filtering device according to claim 18, being designed to filter a liquid such as fuel or oil in a vehicle.

* * * * *